US012170481B2

(12) United States Patent
Ihs

(10) Patent No.: US 12,170,481 B2
(45) Date of Patent: Dec. 17, 2024

(54) DC-DC VOLTAGE CONTROL MODE WITH SEAMLESS PFM AND LOAD-LINE OPERATION

(71) Applicant: Endura IP Holdings Ltd., George Town (KY)

(72) Inventor: Hassan Ihs, Encinitas, CA (US)

(73) Assignee: Endura IP Holdings Ltd., George Town (KY)

( * ) Notice: Subject to any disclaimer, the term of this patent is extended or adjusted under 35 U.S.C. 154(b) by 143 days.

(21) Appl. No.: 17/649,293

(22) Filed: Jan. 28, 2022

(65) Prior Publication Data

US 2022/0247312 A1     Aug. 4, 2022

Related U.S. Application Data

(60) Provisional application No. 63/143,205, filed on Jan. 29, 2021.

(51) Int. Cl.
*H02M 3/158*     (2006.01)
*H02M 3/157*     (2006.01)

(52) U.S. Cl.
CPC ........... *H02M 3/158* (2013.01); *H02M 3/157* (2013.01)

(58) Field of Classification Search
CPC ........................................ H02M 3/155–1588
See application file for complete search history.

(56) References Cited

U.S. PATENT DOCUMENTS

| 6,229,289 | B1 | 5/2001 | Piovaccari et al. |
| 6,509,721 | B1* | 1/2003 | Liebler ................. H02M 3/158 |
| | | | 323/283 |
| 2008/0007238 | A1* | 1/2008 | Ohtake ............... H02M 3/1588 |
| | | | 323/284 |
| 2009/0174383 | A1 | 7/2009 | Tsui et al. |
| 2009/0284235 | A1* | 11/2009 | Weng .................... H02M 3/156 |
| | | | 323/222 |
| 2015/0289325 | A1 | 10/2015 | Szolusha |
| 2016/0094120 | A1 | 3/2016 | Kelly |

FOREIGN PATENT DOCUMENTS

| KR | 1020190024918 A | 3/2019 |
| WO | 2018084986 A1 | 5/2018 |
| WO | 2022165522 A1 | 8/2022 |

OTHER PUBLICATIONS

International Preliminary Report on Patentability for Application No. PCT/US2022/070419, Filing Date Jan. 28, 2022, Report Issued Jul. 31, 2023, 4 pgs.
International Search Report and Written Opinion for Application No. PCT/US2022/070419, Filing Date Jan. 28, 2022, Search completed May 19, 2022, Mailed May 19, 2022, 5 pgs.

* cited by examiner

*Primary Examiner* — Peter M Novak
(74) *Attorney, Agent, or Firm* — KPPB LLP

(57) ABSTRACT

A DC-DC power converter with closed loop error compensation may operate in both pulse width modulation (PWM) mode and pulse frequency modulation (PFM) mode. The DC-DC power converter includes type III compensation, and is operable in PWM mode and PFM mode. Use of a bypass switch for an output inductor of the power converter may increase stability of a loop including type III compensation.

13 Claims, 9 Drawing Sheets

DC-DC VOLTAGE CONTROL MODE WITH SEAMLESS PFM AND LOAD-LINE OPERATION

CROSS REFERENCE TO RELATED APPLICATION

This application claims the benefit of the filing date of U.S. Provisional Patent Application No. 63/143,205, filed on Jan. 29, 2021, the disclosure of which is incorporated by reference herein.

BACKGROUND OF THE INVENTION

The present invention relates generally to power management for semiconductor devices, and more particularly to pulse frequency modulation and/or load line operation for buck power converters using type III compensators in their power regulation control feedback loops.

Integrated circuits generally require provision of power within particular parameters during operation. The provision of such power may face many complexities. For example, semiconductor chips including the integrated circuits may have different portions that require power at the same or different times, different portions may require power within different parameters, and some portions may utilize different amounts of power at different times. This may be particularly true for those chips integrating multiple components that may be considered a system-on-chip (SOC).

In many applications, minimizing supplied power may be desired for a variety of reasons, for example to reduce component heating and/or to reduce unnecessarily diminishing available battery power. In some applications it may also be desirable to supply power in such a way that discrete changes in power required by circuits does not result in transient occurrence that may degrade circuit operation, or that excessive power is not supplied to the circuits.

BRIEF SUMMARY OF THE INVENTION

Some embodiments provide a DC-DC power converter with closed loop error compensation that may operate in both pulse width modulation (PWM) mode and pulse frequency modulation (PFM) mode. Some embodiments provide modifications to a DC-DC power converter with type III compensation operable in PWM mode that provide for operation in PFM mode. Some embodiments additionally provide use of a bypass switch for an output inductor of the power converter, which may increase stability of a loop including type III compensation.

Some embodiments provide a DC-DC power converter with a power regulation feedback loop. The power regulation feedback loop includes type III compensation circuit and a freewheel feedback loop including a replica power stage. Either of the power regulation feedback loop or the freewheel feedback loop is selectively made active depending on output power requirements. In some embodiments the power regulation feedback loop is used in operating the power converter using a PWM mode. In some embodiments the freewheel feedback loop is used in operating the power converter, at least at times, in a PFM mode. In some embodiments the freewheel feedback loop is used in operating the power converter in a PWM mode in some conditions. In some embodiments the freewheel feedback loop includes a load line replica that may be used to clamp a duty cycle of the PWM mode. In some embodiments the duty cycle of the PWM mode is clamped in high load conditions.

In some embodiments a state machine is used to determine whether the power converter uses the power regulation feedback loop or the freewheel feedback loop. In some embodiments the state machine is also used to determine whether to operate the converter in a load line mode (which in some embodiments may be considered to be an adaptive voltage positioning mode. In some embodiments the state machine is used to determine whether the converter uses the load line replica in clamping the duty cycle of the PWM mode. In some embodiments the state machine is used to determine whether the power converter operates in PWM mode or PFM mode. In some embodiments the power converter has a buck configuration.

Some embodiments provide a DC-DC power converter comprising: a power stage and output inductor and output capacitor for coupling to a load; a first feedback loop including a type III compensator for determining a duty cycle for the power stage based on an output voltage provided to the load; a second feedback loop, including a replica power stage and replica output inductor and replica output capacitor, for determining the duty cycle for the power stage; and logic circuitry configured for selecting use of the first feedback loop in a first mode of operation and for selecting use of the second feedback loop in a second mode of operation. Some embodiments further provide a load replica selectively couplable into the second feedback loop, and wherein the logic circuitry is further configured for selecting coupling of the load replica into the second feedback loop in a third mode of operation. In some embodiments the first mode of operation is a voltage regulation mode of operation, the second mode of operation is a pulse frequency modulation (PFM) freewheel mode of operation, and the third mode of operation is a load line mode of operation. In some embodiments switches of the power stage operate in a pulse width modulation (PWM) mode during the first mode of operation.

Some embodiments provide a DC-DC power converter. The DC-DC power converter comprises a power stage and output inductor and output capacitor for coupling to a load. The DC-DC power converter also comprises a first feedback loop including a type III compensator for determining a duty cycle for the power stage based on an output voltage provided to the load. The DC-DC power converter also comprises a second feedback loop, including a replica power stage and replica output inductor and replica output capacitor, for determining the duty cycle for the power stage. And the DC-DC power converter also comprises logic circuitry configured for selecting use of the first feedback loop in a first mode of operation and for selecting use of the second feedback loop in a second mode of operation. Some embodiments further provide a load replica selectively couplable into the second feedback loop, and wherein the logic circuitry is further configured for selecting coupling of the load replica into the second feedback loop in a third mode of operation. In some embodiments the first mode of operation is a voltage regulation mode of operation, the second mode of operation is a pulse frequency modulation (PFM) freewheel mode of operation, and the third mode of operation is a load line mode of operation. In some embodiments switches of the power stage operate in a pulse width modulation (PWM) mode during the first mode of operation.

Some embodiments provide a DC-DC power converter. The DC-DC power converter comprises a power stage and an output inductor and an output capacitor, in a buck configuration, for coupling to a load. The DC-DC power converter also comprises a first feedback loop including a type III compensator, for determining a duty cycle for the power stage in a first mode of operation based on an output voltage provided to the load. The DC-DC power converter also comprises a second feedback loop including a replica power stage and a resistor and a replica output capacitor and the type III compensator, for determining the duty cycle for the power stage in a second mode of operation, and the DC-DC power converter also comprises logic circuitry configured for selecting use of the first feedback loop in the first mode of operation and for selecting use of the second feedback loop in the second mode of operation. Some embodiments further comprise a load replica selectively couplable into the second feedback loop, and wherein the logic circuitry is further configured for selecting coupling of the load replica into the second feedback loop in a third mode of operation. In some embodiments the first mode of operation is a voltage regulation mode of operation, the second mode of operation is a pulse frequency modulation (PFM) freewheel mode of operation, and the third mode of operation is a load line mode of operation. In some embodiments the voltage regulation mode of operation is a pulse width modulation (PWM) mode of operation. In some embodiments the logic circuitry is configured to transition from selection of use of the PWM mode of operation to the PFM freewheel mode of operation if output voltage provided to the load is greater than a first voltage and a signal indicative of the duty cycle indicates lower power usage by the load. In some embodiments wherein the logic circuitry is configured to transition from selection of use of the PFM freewheel mode of operation to the PWM mode of operation if output voltage provided to the load is less than a second voltage. In some embodiments the logic circuitry is configured to transition from selection of use of the PWM mode of operation to the load line mode of operation if output voltage provided to the load is less than the second voltage. In some embodiments the logic circuitry is configured to transition from selection of use of the load line mode of operation to the PWM mode of operation if output voltage provided to the load is greater than the first voltage. In some embodiments the power stage comprises a high side switch and a low side switch coupled in series between a higher voltage source and a lower voltage source, with the output inductor having a first end coupled to a node between the high side switch and the low side switch, and with the output inductor having a second end coupled to ground by way of the output capacitor. Some embodiments further comprise a bypass switch coupling the first end of the output inductor and the second end of the output inductor. In some embodiments a controller of the power stage controls operation of the high side switch, the low side switch, and the bypass switch. In some embodiments the replica power stage comprises a replica high side switch and a replica low side switch coupled in series between a higher voltage source and a lower voltage source, with the resistor having a first end coupled to a node between the replica high side switch and the replica low side switch, and with the resistor having a second end coupled to ground by way of the replica output capacitor.

Some embodiments provide a DC-DC power converter. The DC-DC power converter comprises a buck power converter. The DC-DC power converter also comprises a power regulation feedback loop, including type III compensation circuit, selectively coupled to the buck power converter. The DC-DC power converter also comprises a freewheel feedback loop including a replica power stage selectively coupled to the buck power converter; and a state machine configured to generate a signal to command coupling of the power regulation feedback loop to the buck power converter or coupling of the freewheel feedback loop to the buck power converter based on an indication of output voltage of the buck power converter and/or a signal indicative of a duty cycle of operation of the buck power converter. In some embodiments the power regulation feedback loop is configured to operate the buck power converter in a pulse width modulation (PWM) mode. In some embodiments the freewheel feedback loop is configured to operate the buck power converter in a pulse frequency modulation (PFM) mode. In some embodiments the freewheel feedback loop includes a load line replica selectively coupled to the replica power stage, and wherein the freewheel feedback loop is configured to operate the buck power converter in a pulse width modulation (PWM) mode with a clamped duty cycle with the load line replica selectively coupled to the replica power stage. In some embodiments the state machine is further configured to generate a signal to command coupling of the load line replica to the replica power stage based on signal indicative of a duty cycle of operation of the buck power converter.

These and other aspects of the invention are more fully comprehended upon review of this disclosure.

DETAILED DESCRIPTION

Figure 1:
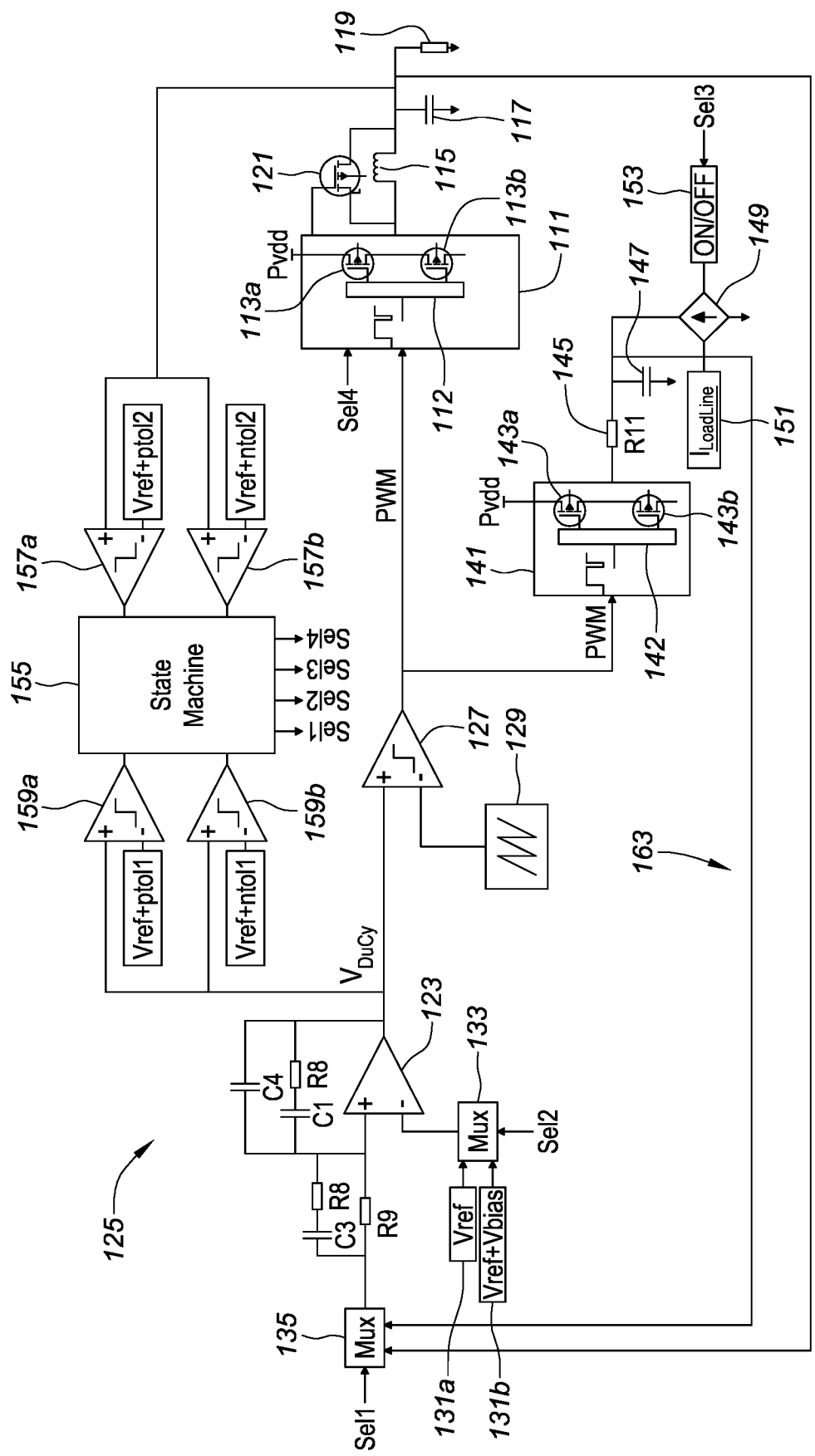
FIG. 1 is a semi-block diagram, semi-schematic of a DC-DC power converter in accordance with aspects of the invention.

FIG. 1 is a semi-block diagram, semi-schematic of a DC-DC power converter in accordance with aspects of the invention. In some aspects the DC-DC power converter can be considered to provide a voltage control mode with seamless PFM and load line operation. The power converter includes a power stage and output inductor and output capacitor, in a buck configuration. For the power stage 111, a high side switch 113a and a low side switch 113b are coupled in series between a higher voltage source, for example Pvdd, and a lower voltage source, for example ground. In operation, the high side switch may be active with the low side switch inactive, the low side switch may be active with the high side switch inactive, or both switches may be inactive. The output inductor 115 has a first end coupled to a node between the high side switch and the low side switch. A second end of the inductor is coupled to ground by way of an output capacitor 117. A bypass switch 121, optional in some embodiments, couples the first end and the second end of the inductor. A node between the second end of the inductor and the output capacitor provides an output of the converter. A load 119, parallel to the output capacitor, receives power from the output of the converter.

A controller 112 of the power stage controls operation of the high side switch and the low side switch, and, if present, the bypass switch. In some embodiments the controller controls operation of the high side switch and the low side switches based on what may be considered a pulse width modulation (PWM) signal. As discussed herein, the PWM signal may be used to operate the switches in PWM mode, or, through the use of pulse skipping, in pulse frequency modulation (PFM) mode. In some embodiments the controller also receives a signal Sel4 from a state machine 155 indicating the controller should perform pulse skipping operations to operate the switches in PFM mode. In some embodiments the controller receives an indication that the output of the converter is sufficiently high such that pulse skipping should occur.

Voltage control of the output of the converter may be provided by a power regulation feedback loop 161. In the power regulation feedback loop, voltage of the converter output is provided to a type III compensator 125. The type III compensator includes a comparator/amplifier 123 with a resistive/capacitive feedback network. In the example of FIG. 1, the resistive/capacitive feedback network includes a capacitor C1 and a resistance R8 coupled in series between a non-inverting input of the comparator/amplifier and an output of the comparator/amplifier, with a capacitor C4 coupled in parallel to the capacitor C1 and the resistance R8. A capacitor C3 and further resistance R8 is also coupled in parallel to a resistance R9 coupled to the non-inverting input of the comparator/amplifier. The type III compensator generates a duty cycle voltage signal $V_{DuCy}$, based on differences between the voltage converter output, potentially as modified by operation of the type III compensator, and a reference voltage. The duty cycle voltage signal is compared to a sawtooth signal, generated for example by a sawtooth signal generator 129, by a comparator 127, with the output of the comparator providing the PWM signal.

Control of the converter may instead be provided by a freewheel feedback loop 163. Use of the power regulation feedback loop or the freewheel feedback loop is determined by a state machine 155. As an example, FIG. 1 shows a multiplexer selecting either the converter output voltage, for the power regulation feedback loop, or a signal for the freewheel feedback loop, based on a first selection signal Sel1 generated by the state machine. The multiplexer provides the selected signal to the type III compensator, effectively selecting the power regulation feedback loop or the freewheel feedback loop.

The freewheel feedback loop does not use the voltage of the output of the converter. Instead, the freewheel feedback loop provides the PWM signal to a replica power stage 141. The replica power stage, like the power stage 111, includes a replica high side switch 143a, and a replica low side switch 143b coupled in series between a higher voltage source, for example Pvdd, and a lower voltage source, for example ground. The replica high side switch and the replica low side switch are sized to be much smaller than the power stage high side switch and low side switch in many embodiments, for example to reduce power usage by the replica. In operation, the replica high side switch may be active with the replica low side switch inactive, the replica low side switch may be active with the replica high side switch inactive, or both switches may be inactive. A controller 142 of the replica power stage controls operation of the replica high side switch and the replica low side switch based on the PWM signal.

Instead of an output inductor, a resistor 145 has a first end coupled to a node between the replica high side switch and the replica low side switch. A second end of the resistor is coupled to ground by way of a replica output capacitor 147. A node between the second end of the resistor and the replica output capacitor provides an output, which is provided to the type III compensator 125 by way of the multiplexer 135. In many embodiments, with the freewheel feedback loop active, the voltage reference signal is also set to indicate a voltage somewhat higher than the reference voltage, for example the reference voltage plus a bias voltage. In FIG. 1, this is indicated through provision of both a Vref signal 131a and a Vref+Vbias 131b to a multiplexer 133. The multiplexer 133 selects one of the signals based on a Sel2 signal provided by the state machine 155.

In addition, a replica load 149, parallel to the replica output capacitor, is coupled to the node between the replica output capacitor and the resistor. The replica load is depicted in FIG. 1 in the form of a current source 149. In various embodiments additional circuit elements may be provided, for example a resistor or resistive network, which may be in parallel or partially in parallel to the current source.

In some embodiments the replica load may be selectively activated to provide a load line (or adaptive voltage positioning) mode of operation. In FIG. 1, this is illustrated through use of an on/off switch 153 for the current source, activated by a third selection signal Sel3, determined by the state machine 155.

The state machine 155 determines modes of operation of the converter, for example by way of setting selection signals. In some embodiments the state machine determines modes of operation of the converter based on indications of extent of power used in operation of the load. In FIG. 1, the state machine determines the modes of operation based on levels of the output of the converter, the output voltage in FIG. 1, and levels of the duty cycle signal, $V_{DuCy}$ in FIG. 1. In some embodiments the duty cycle signal $V_{DuCy}$ is lower when power usage by the load is higher, and $V_{DuCy}$ is higher when power usage by the load is lower. In some embodiments higher output voltages of the converter indicates lower power usage by the load, and conversely lower output voltages of the converter indicates higher power usage by the load. In some embodiments $V_{DuCy}$ is proportional to the complement of the duty cycle for the converter. In FIG. 1, four comparators are part of or associated with the state machine. Two of the comparators 157a,b compare output voltage of the converter with Vref plus or minus a tolerance voltage, respectively. More particularly, one comparator 157a determines if output voltage of the converter is greater than Vref plus a tolerance voltage ptol2, and a second comparator 157b determines if output voltage of the converter is less than Vref minus a tolerance voltage ntol2. Two of the comparators 159a,b compare the duty cycle voltage $V_{DuCy}$ with Vref plus or minus a tolerance voltage. More particularly, one comparator 159a determines if $V_{DuCy}$ is greater than Vref plus a tolerance voltage ptol1, and a second comparator 157b determines if $V_{DuCy}$ is less than Vref minus a tolerance voltage ntol1.

In some embodiments the state machine determines the freewheel feedback loop should be used when the load uses higher levels of power. In some embodiments the state machine determines that a load line mode should be used, in addition or instead, when the load uses higher levels of power. In some embodiments the state machine determines the freewheel feedback loop should be used, in addition or instead, when the load uses lower levels of power. In some embodiments the state machine determines that a PFM mode should be used, in addition or instead, when the load uses lower levels of power. In some embodiments higher levels of power are levels of power for which the converter cannot maintain an output voltage equal to or greater than the reference voltage. In some embodiments lower levels of power are levels of power for which the converter can maintain an output voltage greater than the reference voltage.

In some embodiments the state machine determines the power regulation feedback loop should be used when the load uses a mid-range level of power. In some embodiments the state machine in addition or instead determines that a PWM mode should be used. In some embodiments a mid-range level of power is a level of power for which the converter can maintain an output voltage of the desired or reference voltage while operating in a PWM mode.

Figure 2:
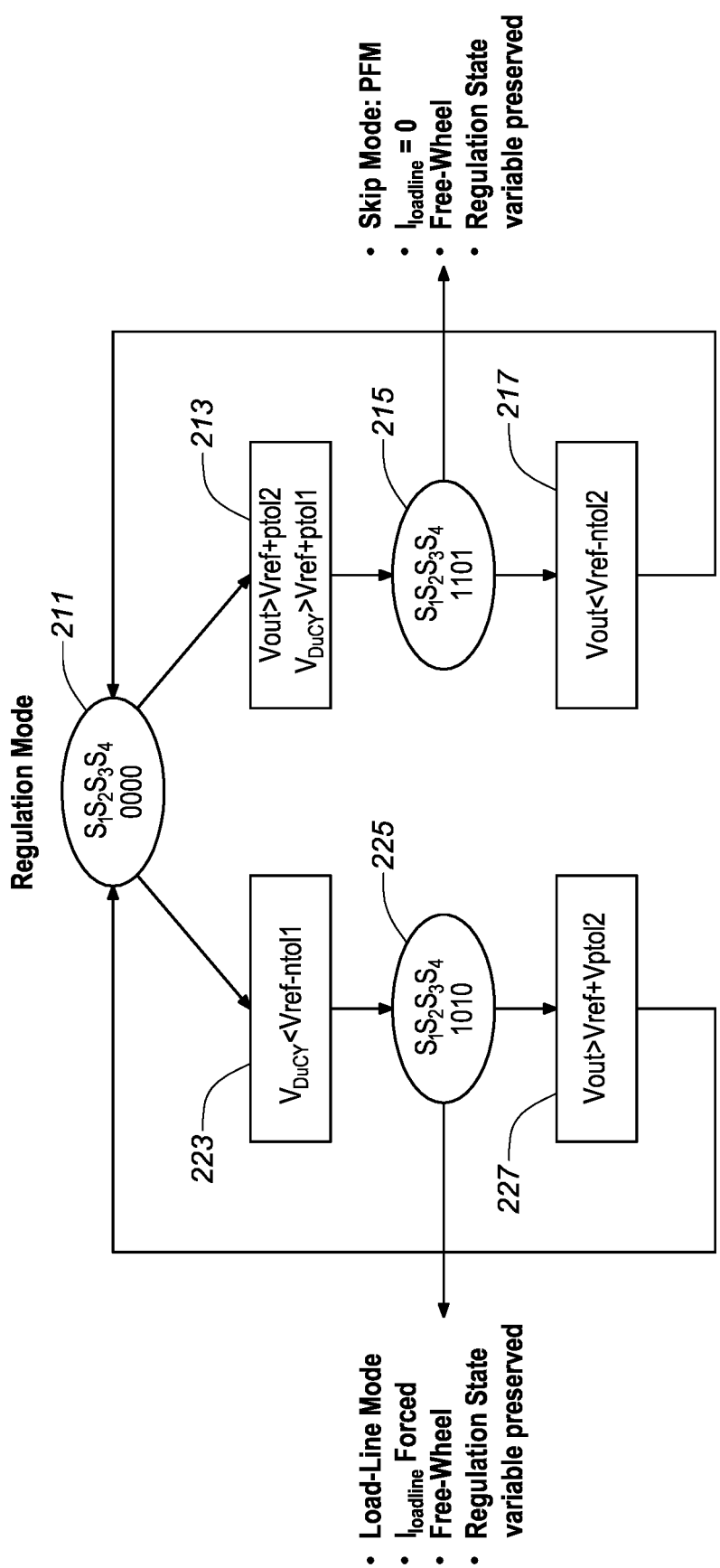
FIG. 2 is an example state diagram for operation of a state machine, for example the state machine of FIG. 1, in accordance with aspects of the invention.

FIG. 2 is an example state diagram for operation of a state machine, for example the state machine of FIG. 1, in accordance with aspects of the invention. In some embodiments the state diagram is a diagram of operation of the state machine of FIG. 1. In some embodiments the state diagram describes operation of a converter, for example the converter of FIG. 1. In some embodiments the state diagram describes logic for determining selection signals for operation of a converter, for example the converter of FIG. 1. In some embodiments the state diagram is implemented using logic circuitry. In some embodiments the state diagram is implemented using logic circuitry and/or program instructions, which may be stored in a memory.

In state 211 the state machine is in a regulation mode. In some embodiments, in the regulation mode the state machine provides signals indicating a converter should operate in a PWM mode. In some embodiments, in the regulation mode the state machine provides signals indicating the converter should operate using a regulation control feedback loop. In some embodiments the state machine sets a first selection signal S1 to a value indicating the converter should use a power regulation feedback loop. In some embodiments the state machine sets a second selection signal S2 to a value indicating the converter should use Vref, an indication of a desired output voltage of the converter, in determining a duty cycle of the converter. In some embodiments the state machine sets a third selection signal S3 to a value indicating the converter should not use a load line mode in operation of the converter. In some embodiments the state machine sets an optional fourth selection signal S4 to a value indicating the converter should not use PFM mode in operation of the converter.

Figure 3:
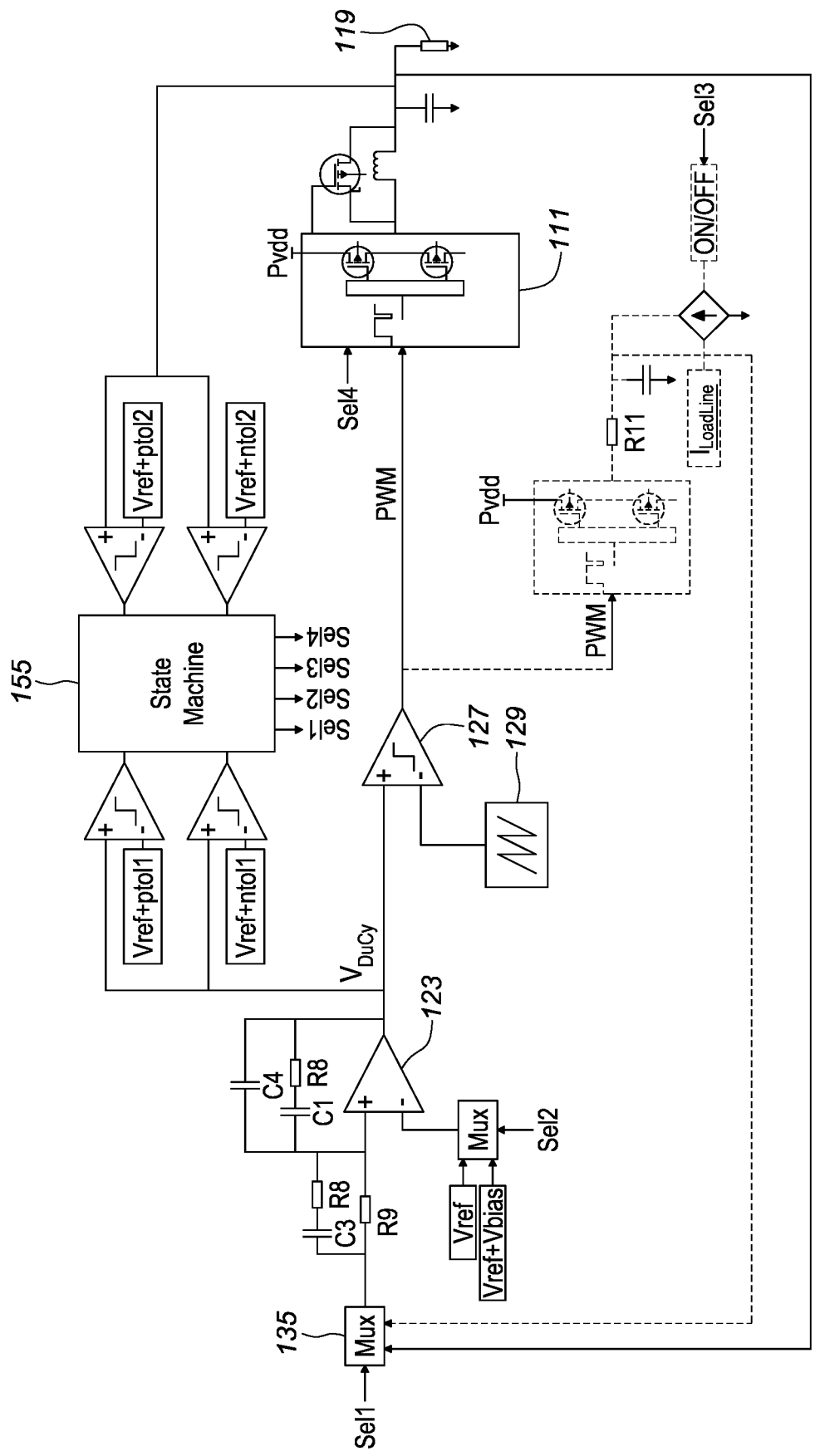
FIG. 3 is the semi-block diagram, semi-schematic of a DC-DC power converter of FIG. 1, operating with the voltage regulation feedback loop.

FIG. 3 is the semi-block diagram, semi-schematic of a DC-DC power converter of FIG. 1, operating with the voltage regulation feedback loop. In some embodiments FIG. 3 illustrates an example of the converter of FIG. 1 configured for operation in the regulation mode by selection signals from the state machine 155. In FIG. 3, the multiplexer 135 is configured to provide the output of the converter to the type III compensator, including the comparator/amplifier 123, such that the regulation feedback loop is used, and not the freewheel feedback loop. The comparator/amplifier is also provided the Vref signal for comparison purposes. The comparator 127 compares $V_{DuCy}$, the output of the comparator/amplifier 123 with a sawtooth wave generated by sawtooth generator 129, to form the PWM signal. The power stage 111 operates its switches based on the PWM signal, for providing power to the load 119.

Returning to FIG. 2, in some embodiments the state machine transitions from state 211 to a state 215. In some embodiments the state machine transitions to the state 215 in light load situations. In some embodiments, and as illustrated in FIG. 2, the state machine transitions to the state 215 if conditions 213 are met. In some embodiments conditions 213 are both output voltage of the converter is greater than Vref plus a tolerance voltage ptol2 and a duty cycle voltage signal $V_{DuCy}$ is greater than Vref plus a tolerance voltage ptol1.

In state 215 the state machine is in a PFM mode. In some embodiments, in the PFM mode the state machine provides signals indicating a converter should operate in a PFM mode. In some embodiments, in the PFM mode the state machine provides signals indicating the converter should operate using a freewheel feedback loop. In some embodiments the state machine sets a first selection signal S1 to a value indicating the converter should use a freewheel feedback loop. In some embodiments the state machine sets a second selection signal S2 to a value indicating the converter should use Vref plus a bias voltage, in determining a duty cycle of the converter. In some embodiments the state machine sets a third selection signal S3 to a value indicating the converter should not use a load line mode in operation of the converter. In some embodiments the state machine sets an optional fourth selection signal S4 to a value indicating the converter should use PFM mode in operation of the converter.

Figure 4:
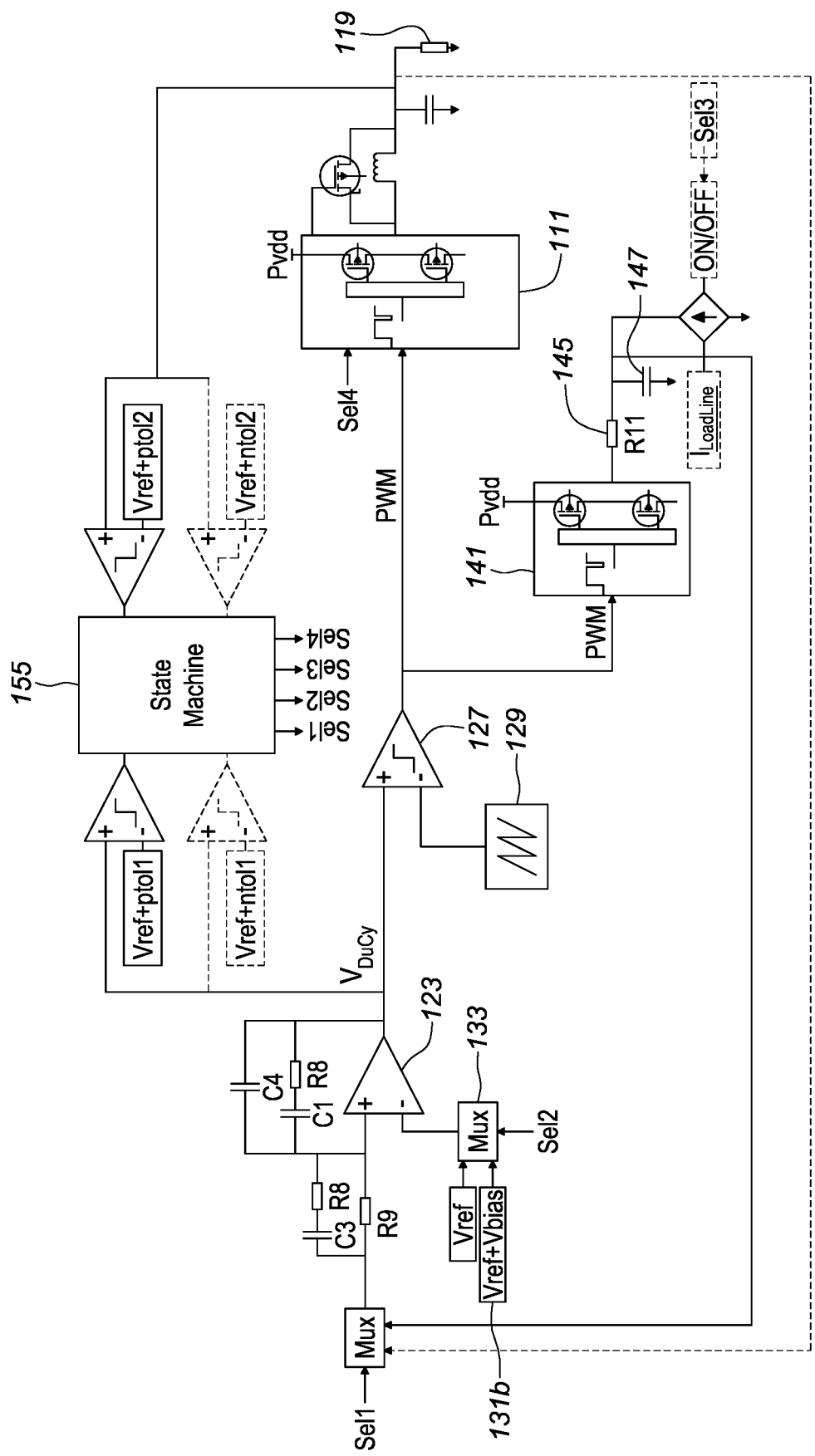
FIG. 4 is the semi-block diagram, semi-schematic of a DC-DC power converter of FIG. 1, operating with the freewheel feedback loop, in PFM mode.

FIG. 4 is the semi-block diagram, semi-schematic of a DC-DC power converter of FIG. 1, operating with the freewheel feedback loop, in PFM mode. In some embodiments FIG. 4 illustrates an example of the converter of FIG. 1 configured for operation in the PFM mode by selection signals from the state machine 155. In FIG. 4, the multiplexer 135 is configured by a selection signal Sel1 to provide the output of the replica to the type III compensator, including the comparator/amplifier 123, such that the freewheel feedback loop is used, and not the regulation feedback loop. The multiplexer 133 is configured by the Sel2 signal to pass the Vref plus a bias voltage to the comparator/amplifier 123. The comparator 127 compares $V_{DuCy}$, the output of the comparator/amplifier 123, with a sawtooth wave generated by sawtooth generator 129, to form the PWM signal. The power stage 111 operates its switches based on the PWM signal, for providing power to the load 119, and in accordance with the Sel4 signal indicating that PFM pulse skipping should occur. In some embodiments pulse skipping is performed when output voltage of the converter is greater than Vref plus a tolerance voltage. In addition, the replica power stage 141 operates its replica switches based on the PWM signal. An output of the replica is provided at the node between the resistor 145 and the replica output capacitor 147.

Figure 6:
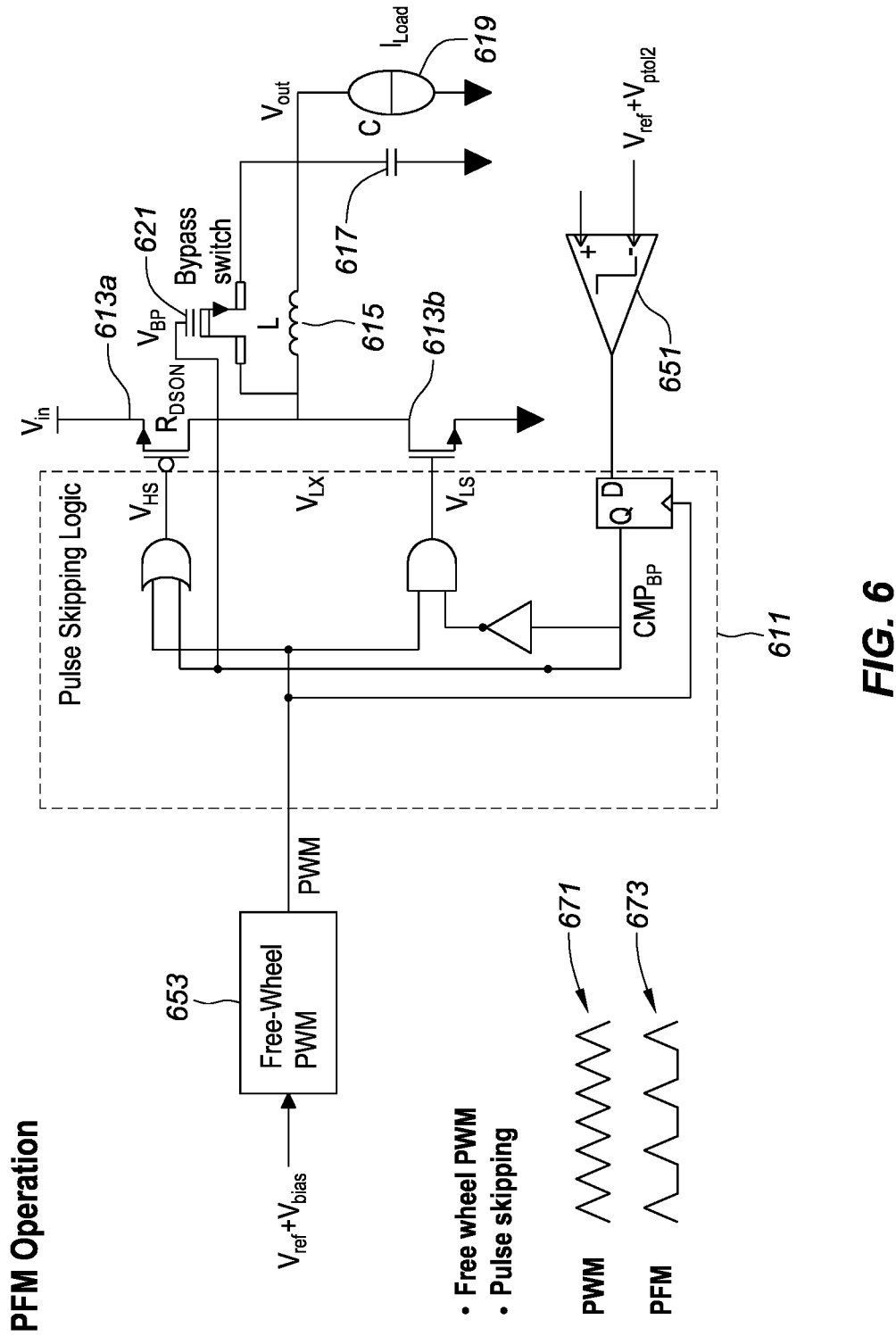
FIG. 6 illustrates a power stage and output elements of a DC-DC power converter along with associated logic elements for determining switch status of power stage switches.

An example of pulse skipping circuitry is provided in FIG. 6. FIG. 6 illustrates a power stage and output elements of a DC-DC power converter along with associated logic elements for determining switch status of power stage switches. In some embodiments the logic elements are used in performing pulse skipping for PFM operation of the power converter.

As illustrated in FIG. 6, the converter includes a high side switch 613a, a low side switch 613b, a bypass switch 621, an output inductor 615, an output capacitor 617, and logic circuitry 611 for controlling the high side, low side, and bypass switches. The high side switch 613a and the low side switch 613b are coupled in series between a first voltage source, Vin, and a second voltage source, for example ground. The first voltage source is at a higher voltage than the second voltage source, with the high side switch coupling the first voltage source to the low side switch, and the low side switch coupling the second voltage source to the high side switch. The high side and low side switches may be formed, for example, with metal-oxide-semiconductor field-effect transistor (MOSFET) transistors, with a p-channel MOS transistor forming the high side switch and an n-channel MOS transistor forming the low side switch. In operation, either the high side switch is active, the low side switch is active, or neither switch is active. For illustrative purposes, the high side and low side switches also show a resistance ($R_{DSON}$) provided by the switches. The output inductor 615 has one end coupled to a node between the high side switch 613a and the low side switch 613b, and also to a first end of the bypass switch 621. Another end of the output inductor is coupled to the output capacitor 617, a second end of the bypass switch 621, and a load 619, with the load current I.sub.LOAD passing through the load. The load may be, for example, a processor core, logic circuitry, or other circuit elements which are to receive regulated power. A node coupling the other end of the output inductor, the output capacitor, and the load generally may be considered the output of the voltage regulator.

The logic circuitry 611 may receive the output signals from the first and second comparators, and the PWM signal, generically indicated as being generated by a free-wheel PWM box 653, to control states of the high side, low side, and bypass switches. The logic circuitry 611 generally controls the states of the high side, low side, and bypass switches by way of producing control signals for controlling those switches.

As shown in FIG. 6, a latch stores the signal produced by a comparator 651. The comparator determines if the output voltage of the converter is greater than Vref plus a tolerance voltage ptol2. The latch stores the signal when the PWM signal transitions to a high state. An output of the latch (which may be referred to as $CMP_{BP}$) is provided to a gate of the bypass switch, an OR gate and, after passing through an inverter, to an AND gate. The OR gate also receives the PWM signal, and provides an output to a gate of the high side switch. The high side switch, active when its gate input is low, is therefore active when both the PWM signal and the output of the latch are low. The AND gate also receives the PWM signal, and provides an output to a gate of the low side switch. The low side switch, active when its gate input is high, is therefore active when the inverted latch output is high and the PWM signal is high.

Returning to FIG. 2, in the diagram of FIG. 2 the state machine transitions back to the regulation mode if the output voltage of the converter is less than a predetermined voltage. This is illustrated as condition 217 in FIG. 2, with output voltage of the converter less than the reference voltage Vref minus a tolerance voltage ntol2.

In some embodiments the state machine transitions from state 211 to a state 225. In some embodiments the state machine transitions to the state 225 in heavy load situations. In some embodiments, and as illustrated in FIG. 2, the state machine transitions to the state 225 if conditions 223 are met. In some embodiments conditions 223 is a duty cycle voltage signal $V_{DuCy}$ is less than Vref minus a tolerance voltage ntol1.

In state 225 the state machine is in a load line mode. In some embodiments, in the load line mode the state machine provides signals indicating a converter should operate in a load line mode. In some embodiments, in the load line mode the state machine provides signals indicating the converter should operate using a freewheel feedback loop. In some embodiments the state machine sets a first selection signal S1 to a value indicating the converter should use a freewheel feedback loop. In some embodiments the state machine sets a second selection signal S2 to a value indicating the converter should use Vref in determining a duty cycle of the converter. In some embodiments the state machine sets a third selection signal S3 to a value indicating the converter should use a load line mode in operation of the converter. In some embodiments the state machine sets an optional fourth selection signal S4 to a value indicating the converter should not use PFM mode in operation of the converter.

Figure 5:
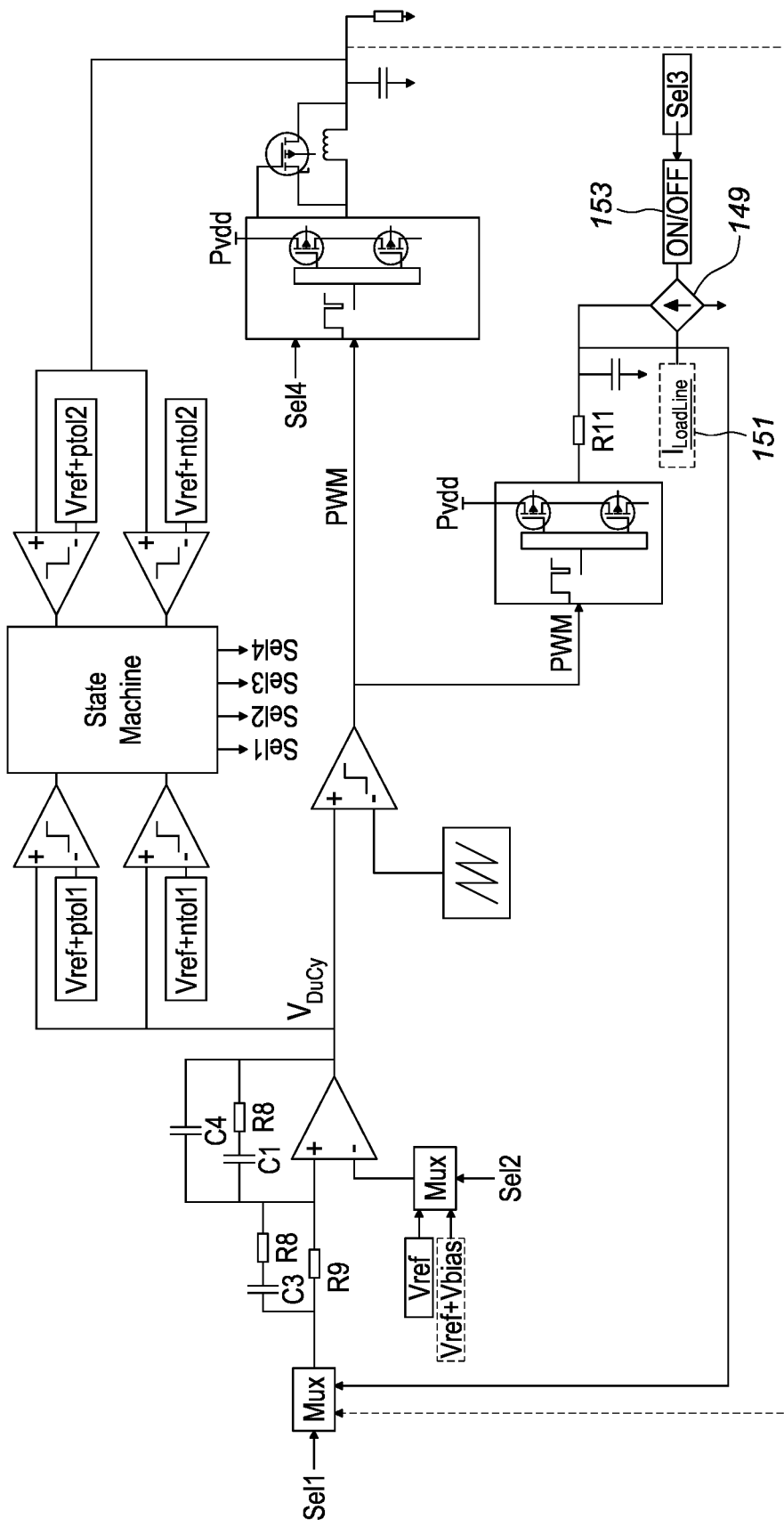
FIG. 5 is the semi-block diagram, semi-schematic of a DC-DC power converter of FIG. 1, operating with the freewheel feedback loop, using load line operations.

FIG. 5 is the semi-block diagram, semi-schematic of a DC-DC power converter of FIG. 1, operating with the freewheel feedback loop, using load line operations. In some embodiments FIG. 5 illustrates an example of the converter of FIG. 1 configured for operation in the load line mode by selection signals from the state machine 155. In FIG. 5, the multiplexer 135 is configured by a selection signal Sel1 to provide the output of the replica to the type III compensator, including the comparator/amplifier 123, such that the freewheel feedback loop is used, and not the regulation feedback loop. The multiplexer 133 is configured by the Sel2 signal to pass Vref to the comparator/amplifier 123. The comparator 127 compares $V_{DuCy}$, the output of the comparator/amplifier 123, with a sawtooth wave generated by sawtooth generator 129, to form the PWM signal. The power stage 111 operates its switches based on the PWM signal, for providing power to the load 119. In addition, the replica power stage 141 operates its replica switches based on the PWM signal. The output of the replica provided at the node between the resistor 145 and the replica output capacitor 147, however, is not merely based on the operation of the replica switches. Instead, the Sel3 signal enables the current generator 149 to generate a current indicative of the current to the load, effectively clamping the output of the replica to a predetermined level.

Returning to FIG. 2, in the diagram of FIG. 2 the state machine transitions back to the regulation mode if the output voltage of the converter is greater than a predetermined voltage. This is illustrated as condition 227 in FIG. 2, with output voltage of the converter greater than the reference voltage Vref plus a tolerance voltage ptol2.

Figure 7A:
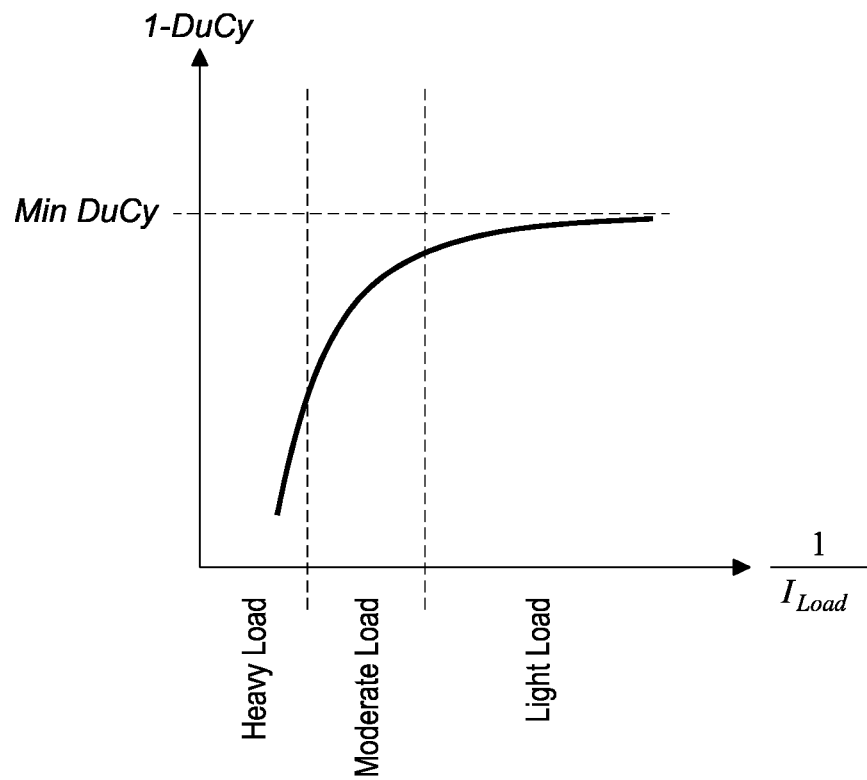
FIGS. 7A and 7B show graphs indicating the complement of duty cycle versus inverse of load current.
Figure 7B:
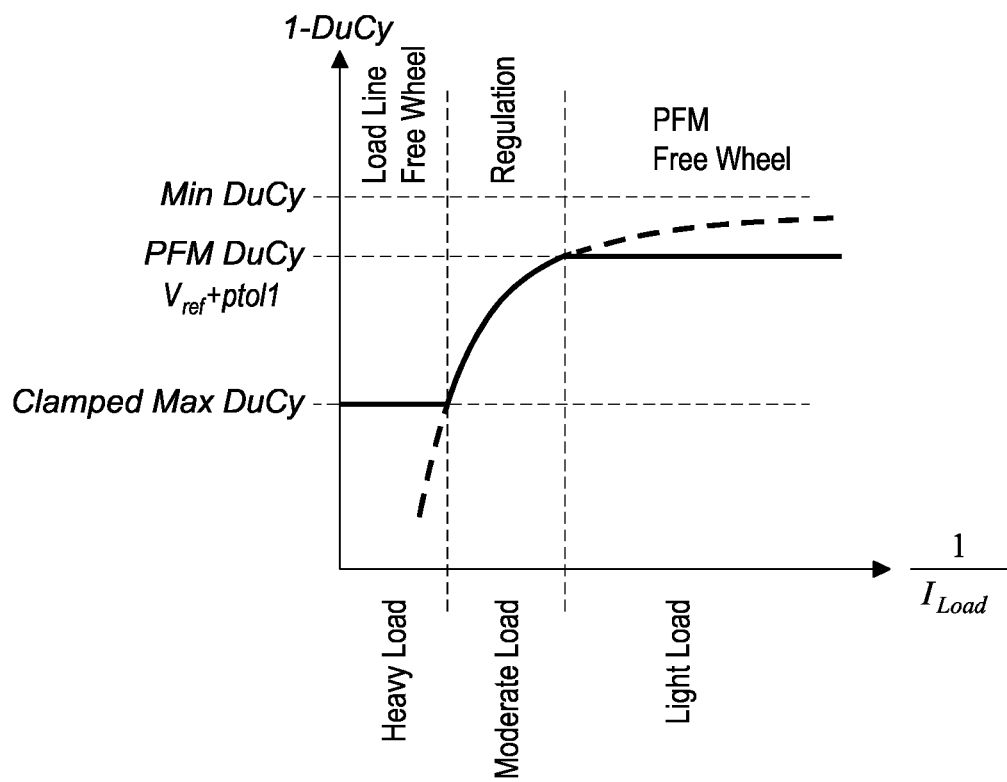

FIGS. 7A and 7B show graphs indicating the complement of the duty cycle 1−DuCy (e.g., 1−x, x being the duty cycle of the converter) versus inverse of load current. A left-side graph shows variation of 1−DuCy with the inverse of load current for a voltage regulator without use of a secondary loop. The graph of FIG. 7A shows that duty cycle is at a minimum under very light loads, and increases as load increases—at first moderately and then sharply as the load approaches a heavy load region. The graph of FIG. 7B shows variation of 1−DuCy with the inverse of load current for a voltage regulator with use of a secondary loop providing freewheel PFM and load line functions. The graph of FIG. 7B shows that in heavy load conditions, with the converter operating using the freewheel feedback loop in load line mode, the duty cycle stays at a constant level. In FIG. 7B, the heavy load constant level is approximate the level of the duty cycle at the transition between a heavy load and a moderate load, and thus less than would otherwise occur in a heavy load condition. Such a situation may result in a decrease in output voltage of the converter, but may be beneficial for overall converter and system operation, for example considering thermal issues, battery drain issues, and other issues. In light load conditions, the duty cycle also stays at a constant level, with the converter operating using the freewheel feedback loop in PFM mode. The constant level in FIG. 7B in light load conditions is shown as corresponding to the duty cycle at entry to converter operation using the freewheel feedback loop in PFM mode.

Figure 8:
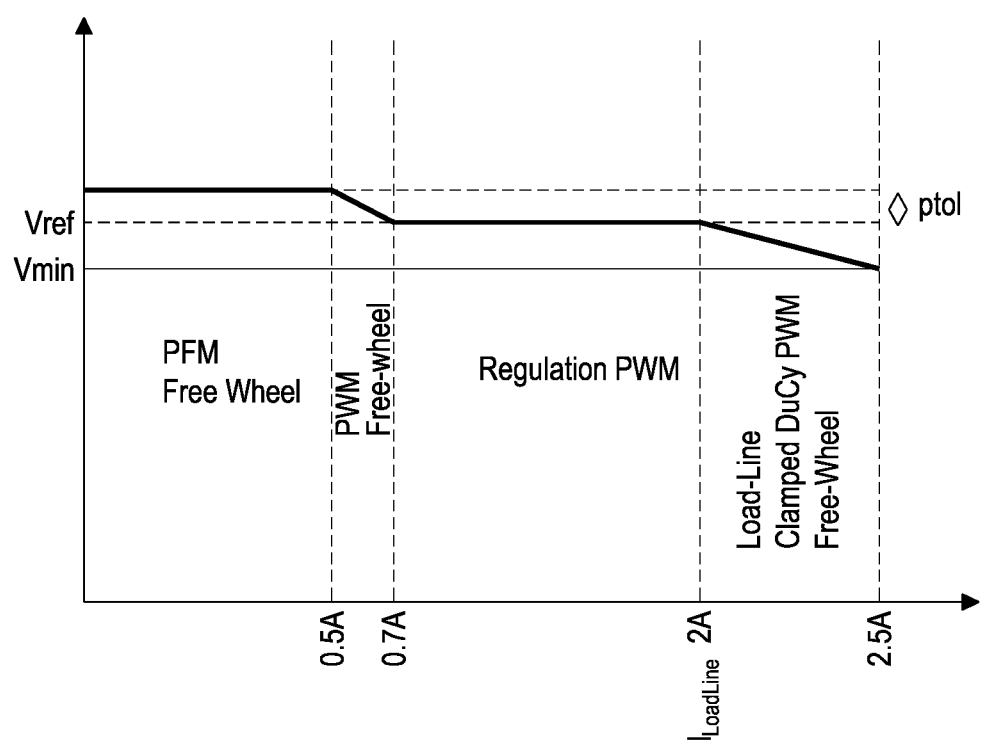
FIG. 8 is a graph illustrating a load-line regulation profile in the context of regulated voltage versus load.

FIG. 8 is a graph illustrating a load-line regulation profile in the context of regulated voltage versus load. At low loads output voltage is regulated at Vref plus a tolerance voltage. Regulating output voltage to a somewhat higher voltage than Vref may allow for improved response to load increases. In the low load conditions, the converter operates using the freewheel feedback loop in PFM mode. As load current increases, the output voltage begins to drop towards Vref. For purposes of the graph of FIG. 8, pulse skipping ceases as the output voltage is below Vref plus the tolerance voltage. Accordingly, although the freewheel feedback loop may be continued to be used, the converter effectively operates in a PWM mode.

Once the output voltage drops to Vref, under moderate loading, the converter transitions to use of the regulation feedback loop, with the converter operating in PWM mode. With further increases in load current, however, at some point the converter may not be able to maintain output voltage at Vref. With load current at this point and above, the converter operates using the freewheel feedback loop, clamping the duty cycle.

Figure 9:
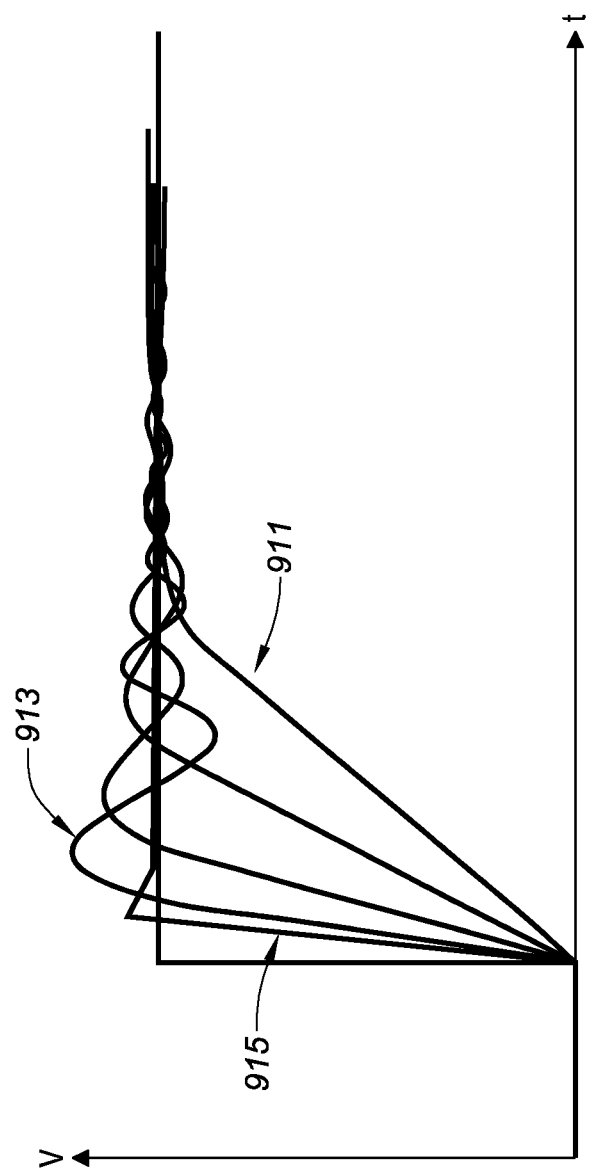
FIG. 9 illustrates transient response damping through use of a bypass switch.

FIG. 9 illustrates transient response damping through use of a bypass switch. Response of a converter to sudden increases in load current requirements may result in output overshoot and ringing. Converters (without a bypass switch) with greater damping may exhibit increase lag time in reaching a desired outputs, as indicated by a most damped curve 911, while those with reduced damping may exhibit increased overshoot and increased settling times, as indicated by a least damped curve 913. The use of the bypass switch, however, allows for reduction of inductor energy oscillations, and may provide both for increased response time and decreased overshoot and settling time, for example as indicated by a bypass control curve 915.

Although the invention has been discussed with respect to various embodiments, it should be recognized that the invention comprises the novel and non-obvious claims supported by this disclosure.

What is claimed is:

1. A DC-DC power converter comprising:
   a power stage and an output inductor and an output capacitor, in a buck configuration, for coupling to a load;
   a type III compensator;
   a first feedback loop including the type III compensator, for determining a duty cycle for the power stage in a first mode of operation based on an output voltage provided to the load; and
   a second feedback loop including a replica power stage and a resistor and a replica output capacitor and the type III compensator, for determining the duty cycle for the power stage in a second mode of operation;
   logic circuitry configured for selecting use of the first feedback loop in the first mode of operation and for selecting use of the second feedback loop in the second mode of operation; and
   a load replica selectively couplable into the second feedback loop;
   wherein the logic circuitry is further configured for selecting coupling of the load replica into the second feedback loop in a third mode of operation.

2. The DC-DC power converter of claim 1, wherein the replica power stage comprises a replica high side switch and a replica low side switch coupled in series between a higher voltage source and a lower voltage source, with the resistor having a first end coupled to a node between the replica high side switch and the replica low side switch, and with the resistor having a second end coupled to ground by way of the replica output capacitor.

3. The DC-DC power converter of claim 1, wherein the power stage comprises a high side switch and a low side switch coupled in series between a higher voltage source and a lower voltage source, with the output inductor having a first end coupled to a node between the high side switch and the low side switch, and with the output inductor having a second end coupled to ground by way of the output capacitor.

4. The DC-DC power converter of claim 3, further comprising a bypass switch coupling the first end of the output inductor and the second end of the output inductor.

5. The DC-DC power converter of claim 4, wherein a controller of the power stage controls operation of the high side switch, the low side switch, and the bypass switch.

6. The DC-DC power converter of claim 1, wherein the first mode of operation is a voltage regulation mode of operation, the second mode of operation is a pulse frequency modulation (PFM) freewheel mode of operation, and the third mode of operation is a load line mode of operation.

7. The DC-DC power converter of claim 6, wherein the voltage regulation mode of operation is a pulse width modulation (PWM) mode of operation.

8. The DC-DC power converter of claim 7, wherein the logic circuitry is configured to transition from selection of use of the PWM mode of operation to the PFM freewheel mode of operation if output voltage provided to the load is greater than a first voltage and a signal indicative of the duty cycle indicates lower power usage by the load.

9. The DC-DC power converter of claim 8, wherein the logic circuitry is configured to transition from selection of use of the PFM freewheel mode of operation to the PWM mode of operation if output voltage provided to the load is less than a second voltage.

10. The DC-DC power converter of claim 9, wherein the logic circuitry is configured to transition from selection of use of the PWM mode of operation to the load line mode of operation if output voltage provided to the load is less than the second voltage.

11. The DC-DC power converter of claim 10, wherein the logic circuitry is configured to transition from selection of use of the load line mode of operation to the PWM mode of operation if output voltage provided to the load is greater than the first voltage.

12. A DC-DC power converter, comprising:
    a buck power converter;
    a power regulation feedback loop, including type III compensation circuit, selectively coupled to the buck power converter;
    a freewheel feedback loop including a replica power stage selectively coupled to the buck power converter; and
    a state machine configured to generate a signal to command coupling of the power regulation feedback loop to the buck power converter or coupling of the freewheel feedback loop to the buck power converter based on an indication of output voltage of the buck power converter and/or a signal indicative of a duty cycle of operation of the buck power converter;
    wherein the freewheel feedback loop includes a load line replica selectively coupled to the replica power stage, and wherein the freewheel feedback loop is configured to operate the buck power converter in a pulse width modulation (PWM) mode with a clamped duty cycle with the load line replica selectively coupled to the replica power stage.

13. The DC-DC power converter of claim 12, wherein the state machine is further configured to generate a signal to command coupling of the load line replica to the replica power stage based on signal indicative of a duty cycle of operation of the buck power converter.

* * * * *